United States Patent [19]

Maejima et al.

[11] Patent Number: 5,335,339
[45] Date of Patent: Aug. 2, 1994

[54] EQUIPMENT AND METHOD FOR INTERACTIVE TESTING AND SIMULATING OF A SPECIFICATION OF A NETWORK SYSTEM

[75] Inventors: Yukihito Maejima; Toko Ohtsubo, both of Yokohama; Mitsuyuki Masui, Yokosuka; Noriyuki Abe, Ishikawa; Katsuhiko Yuura, Kodaira; Kenji Mochizuki, Yokohama, all of Japan

[73] Assignee: Hitachi, Ltd., Tokyo, Japan

[21] Appl. No.: 793,590

[22] Filed: Nov. 18, 1991

[30] Foreign Application Priority Data

Nov. 22, 1990 [JP] Japan ................................ 2-316125
Apr. 5, 1991 [JP] Japan ................................ 3-072803

[51] Int. Cl.$^5$ .............................................. G06F 3/00
[52] U.S. Cl. .................... 395/500; 364/221.2; 364/242.94; 364/DIG. 1; 364/578; 395/800
[58] Field of Search ............... 395/800, 575, 500, 100, 395/118, 116, 159, 161, 155; 340/522, 521; 364/578

[56] References Cited

U.S. PATENT DOCUMENTS

| | | | |
|---|---|---|---|
| 4,107,663 | 8/1978 | Morimoto | 345/140 |
| 4,644,478 | 2/1987 | Stephens et al. | 364/550 |
| 4,649,515 | 3/1987 | Thompson et al. | 364/900 |
| 4,791,556 | 12/1988 | Vilkaitis | 395/159 |
| 4,809,170 | 2/1989 | Leblang et al. | 364/200 |
| 4,821,220 | 4/1989 | Duisberg | 364/578 |
| 4,977,390 | 12/1990 | Saylor et al. | 340/521 |
| 5,061,916 | 10/1991 | French et al. | 340/522 |
| 5,133,063 | 7/1992 | Naito et al. | 395/500 |
| 5,136,528 | 8/1992 | Fordham et al. | 364/578 |
| 5,159,685 | 10/1992 | Kung | 395/575 |
| 5,168,554 | 12/1992 | Luke | 395/161 |
| 5,173,869 | 12/1992 | Sakamoto | 364/578 |
| 5,177,420 | 1/1993 | Wada | 318/568.11 |
| 5,225,997 | 7/1993 | Lederer et al. | 364/550 |
| 5,274,574 | 12/1993 | Tsujido et al. | 364/551.02 |

*Primary Examiner*—Lawrence E. Anderson
*Assistant Examiner*—Meng-Ai T. An
*Attorney, Agent, or Firm*—Fay, Sharpe, Beall, Fagan, Minnich & McKee

[57] ABSTRACT

An equipment for displaying a specification of behavior of a real time system includes a program memory for storing a plurality of program objects for simulating operations of objects indicative of an arrangement of the real time system and a plurality of graphical symbol objects for expressing operational states of the objects and relationships between the objects in the form of a graphical symbol representation on a display screen. In the equipment, the plurality of program objects are linked with the plurality of symbol objects through an inter-program communication control routine. Each of the program objects, when receiving a message from the communication control routine, is executed for simulation operation according to the received message to thereby generate a new message to be sent to the associated program routine and a new message indicative of an object state change to be sent to one of the symbol objects corresponding to the associated object. Each of the symbol objects, when receiving the message from the communication control routine, is executed to change a display state of one of symbols corresponding to the associated symbol object on the display screen.

23 Claims, 11 Drawing Sheets

FIG. 5

301A ( defclass EXCHANGE/P ( part ) 302A
303A ( ( off-hook )
( on-hook )
( status )
.............))

301B ( defclass MULTIFUNCTIONAL-TELEPHONE/P ( part ) 302B
303B ( ( hook )
( display )
( dial )
.............))

305 ( defmethod off-hook ( ( EX EXCHANGE ) ( MFT MULTIFUNCTIONAL-TELEPHONE )
( setf ( slot-value EX' off-hook )
( slot-value MFT' name ) ) )
( Transmit message EX MFT 'dial tone )
.............)

| PROGRAM NAME (310) | SYMBOL NAME (311) |
|---|---|
| EXCHANGE / P | EXCHANGE |
| ⋮ | ⋮ |

| SYMBOL NAME (311) | PROGRAM NAME (310) |
|---|---|
| EXCHANGE | EXCHANGE / P |
| ⋮ | ⋮ |

EQUIPMENT AND METHOD FOR INTERACTIVE TESTING AND SIMULATING OF A SPECIFICATION OF A NETWORK SYSTEM

BACKGROUND OF THE INVENTION

1. Field of the Invention

The present invention generally relates to equipments and methods for displaying a specification of behavior of a real time system and, more particularly, to an equipment and method for displaying on a display screen the simulated behavior specification of a real time system, such as typically a communication system or an exchange system.

2. Description of the Related Art

A prior art method for expressing the behavior specification of a real time system such as typically a communication system or an exchange system and for displaying the simulated behavior specification on a display screen is reported, for example, in a Proceeding, Information Processing of Society, 39th Conference (October 1989), 5S-9, pp. 1582-1583, 1989 or in a Technical Report, Information Processing of Society of Japan, SE 71-1 pp. 1-8, 1990, 2. 8. In this prior art method, behavior objects (objects) corresponding to the constituent elements of the real time system necessary for explanation of the operation of the system are expressed in the form of structure icons (graphical symbols) and changes in the states of the objects when the operation of the system is changed with time are reflected in changes in the states of the structure icons displayed on the display screen.

According to the above prior art method, the behavior specifications of the respective elements of the real time system corresponding to service functions are previously defined as behavior scenarios of system behaviors arranged on a time series basis and the entire behavior specification of the system is expressed in the form of combinations of such behavior scenarios.

In each operational scenario, a first version of sequence of messages to be transferred between objects is prepared on the basis of changes in the states of the objects and then the first version of message sequence is modified to obtain an accurate message sequence.

In the prior art technique, since the behavior scenario is based not on user's operational sequence but on the message sequence to be transferred between the objects of the interior of the real time system, the system designer can relatively easily understand it. However, it is relatively hard for a user (system purchase customer) wanting to understand the function and operation of the real time system to understand it on the basis of the system behavior specification displayed on the display screen, because, for example, the user cannot interactively give a desired operational instruction to confirm a response operation from the system.

Accordingly, the prior art has had such a problem that the user cannot positively check the intended behavior specification on the display screen, and thus when the user instructs the system designer to modify it after the system design proceeds into its test stage or after-shipment stage with the system functions different in sense or image between the user and designer, this involves troublesome modification.

SUMMARY OF THE INVENTION

It is an object of the present invention to provide an equipment and method for displaying a specification of behavior of a real time system which allows a user to visually know the operation and function of the system.

Another object of the present invention is to provide an equipment and method for displaying a specification of behavior of a real time system which allows simulated operation of the system in accordance with a pre-prepared message sequence or a user's interactive input command and which allows display of the system behavior specification on a display screen with animation in such a format that the user can easily understand it.

In order to achieve the above objects, in accordance with an aspect of the present invention, there are provided an equipment and method for displaying a specification of behavior of a real time system, which comprise a plurality of programs (program objects) for defining behaviors of various sorts of elements (objects) of the real time system and relationships between the objects and a plurality of programs (graphical symbol objects) for expressing the behavior states of the respective objects and the relationships between the objects in the form of graphical symbols displayed on the display screen, and wherein the plurality of program objects are linked with the plurality of symbol objects through an inter-program communication control routine so that each of the program objects, when receiving a message through the inter-program communication control routine. performs its data processing operation (simulating operation) according to the contents of the received message and also generates a symbol control message for reflecting a change in the state of the object caused by the result of the data processing on the corresponding symbol on the display screen, and transmits the control message to the symbol object corresponding to the symbol.

The above inter-program communication control routine, when passing a received message to the associated program object, sends a symbol control message generated according to the received message to the associated symbol object controlling the display state of the symbol indicative of the message transmission direction determined by the transmission caller and receiver of the received message. As a result, through the message processing of the associated program object, the display state or states of one or a plurality of symbols on the display screen associated with the message are changed under the influence of the function of the symbol object having received the symbol control message generated by the program object or the communication control routine, so that the operation of the real time system can be presented on the display screen to the user with animation.

In accordance with another aspect of the present invention, there are provided an equipment and method for displaying a specification of behavior of a real time system, which further comprise a program name/symbol name conversion table (first conversion table) for finding from the name of a program object the name of a symbol object to control the display state of a graphical symbol corresponding to the program object and a symbol name/program name conversion table (second conversion table) for finding from the name of a symbol object the name of a program object associated with a symbol controlled by the symbol object.

With such an arrangement, when a program object is activated through reception of a message for example, the program object references the first conversion table to designate the name of a symbol object corresponding to the program object, and transmits to the symbol object a control message for reflecting on the display screen a change in the behavior of the real time system caused by the activation of its own object in such a manner that the symbol object is operated to rewrite the state of the display object on the display screen according to the received control message, whereby the behavior of the real time system can be displayed as monitored with animation on a terminal screen in synchronism with the activation or execution of each program object.

Conversely, when a command is issued to a symbol object, the symbol object can find the name of a program object corresponding to the symbol object on the basis of the second conversion table and provide a message indicative of the contents of the command to the program object.

In accordance with a further aspect of the present invention, an equipment and method for displaying a specification of behavior of a real time system comprise a command display routine for displaying a command menu to be used for a user to interactively enter a processing command to a program object, a command input routine for accepting one of commands in the command menu selected by the user, message memory means for storing therein messages transmitted and received between program objects in a time series manner, and a message sequence display routine for displaying a message sequence stored in the message memory means on the display screen as associated with objects for communication of each message.

With the aforementioned arrangement, in response to user's interactively-entered command, the behavior of the real time system can be simulated and a sequence of messages communicated between program objects through the simulating operation can be displayed on the display screen in a time series manner for visual confirmation.

In accordance with a further aspect of the present invention, each of the program objects stores therein log information indicative of a state already executed or to be next executed according to a predetermined operational sequence to determine the next acceptable message or the type of a command according to the log information. The displayed command menu includes a group of acceptable commands to be selectively determined according to the log information.

In yet another aspect of the present invention, a transmission time is previously designated in each message to be executed or generated by each program object so that the communication control routine passes the message to the program object as its destination at the designated time. When each program object is operated at its designated time in this way, the system behavior specification displayed on the display screen can be changed at such a speed that the user can easily understand. Further, it is also possible to generate a plurality of messages at the same time or to simulate such a state of the system that message signals collide with each other.

In other aspect of the present invention, each program object monitors a time taken to receive the next message and issues a message indicative of the time-out to the associated program object or the display screen.

The foregoing and other objects, advantages, manner of operation and novel feature of the present invention will be understood more clearly from the following detailed description when read in conjunction with the accompanying drawings.

BRIEF DESCRIPTION OF THE DRAWINGS

FIG. 5 shows an exemplary structure of a program object;

FIG. 7 shows an exemplary structure of a program name/symbol name conversion table;

FIG. 10 shows an exemplary structure of a symbol name/program name conversion table;

DESCRIPTION OF THE PREFERRED EMBODIMENTS

Figure 1:
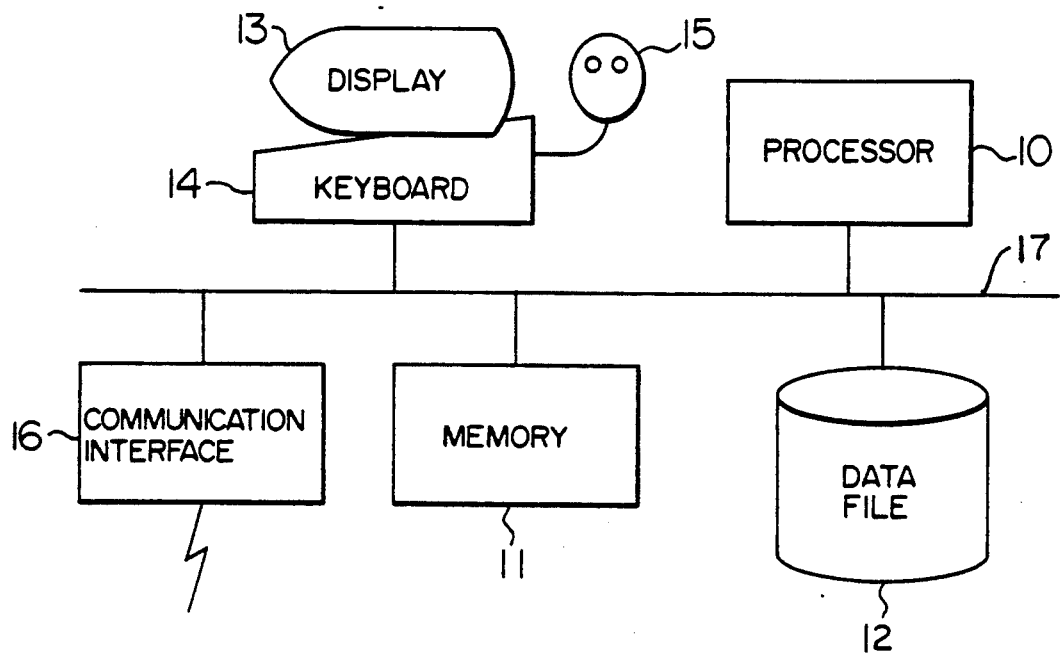
FIG. 1 is a block diagram of an arrangement of an equipment for displaying a specification of behavior of a real time system in accordance with an embodiment of the present invention.

Referring to FIG. 1, there is shown in a block diagram a terminal equipment to which the present invention is applied. The illustrated terminal equipment includes a display 13 for indicating on its display screen an input data and a specification of behavior in a real time system to be described later, a keyboard 14, a pointing device 15 such as mouse for entering a position on the display screen or selecting one of commands, a microprocessor (control unit) 10 for executing various sorts of programs for the behavior simulation, behavior specification display and other functions of the real time system, a memory 11 for storing therein the programs and data, a data file 12 for storing therein message sequences and other data, a communication line interface 16, and a bus 17 connected between these parts.

Figure 2A:
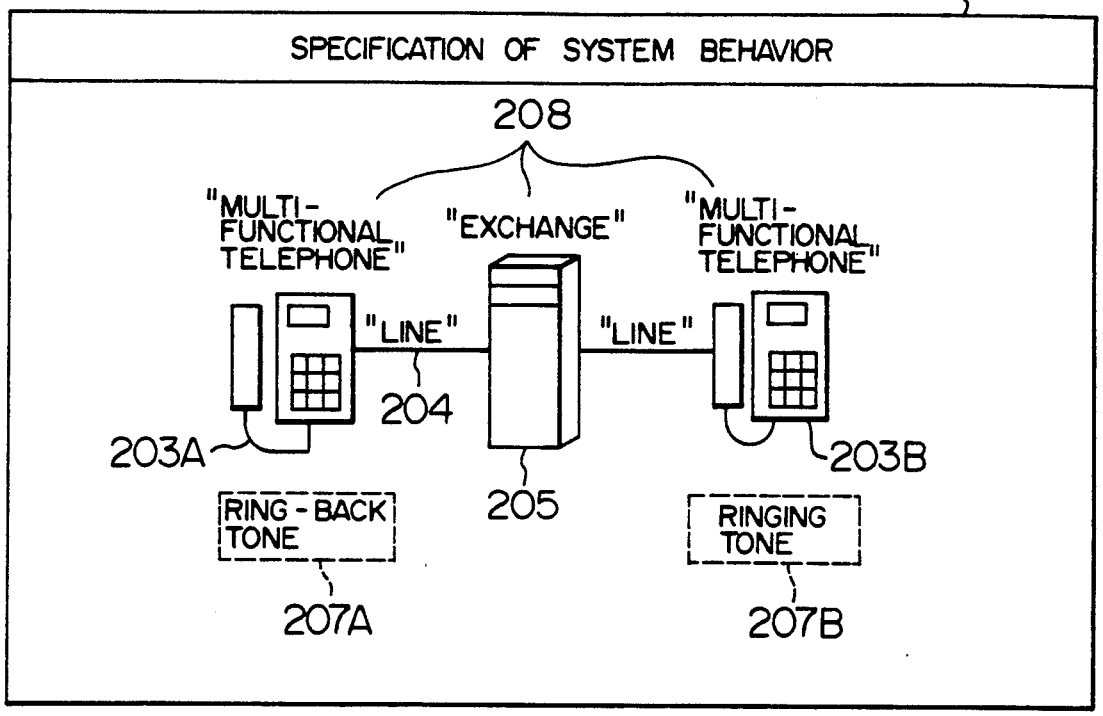
FIG. 2A shows an example of a behavior specification display screen according to the present invention.

FIG. 2A shows an example of a behavior specification display of the real time system appearing on the display screen according to the present invention. In this case, an exchange system is employed as the real time system to be simulated. More in detail, displayed in system behavior specification display window 200 are graphical symbols 203A and 203B indicative of each a graphical representation of a multifunctional telephone set, a graphical symbol 205 indicative of a graphical representation of an exchange, graphical symbols 204 indicative of graphical representations of lines connected between the multifunctional telephone sets and the exchange, and contents 207A and 207B of a message transferred through the operation of a telephone user or through the operation of the multifunctional telephone set or exchange. The graphical symbols indicated in the window 200 have respective symbol names in the form of character strings 208 such as "exchange" and "MULTIFUNCTIONAL TELEPHONE".

The screen shown in FIG. 2A is when the exchange is changed from its number (dial) receive state to its ring-back state. In an actual exchange system, plurality of elements (objects) making up the system cooperate to carry out a predetermined operation in response to a user's operation. In the present invention, a plurality of programs for simulation of the operations of the respective constituent elements of the real time system are prepared. These programs corresponding to the objects are called herein "program objects". The display state of each graphical symbol in the display window 200 is varied when one program object is operated or each time a message data is transferred from one program object to another. Thus, the user can easily know the current behavior of the real time system on the basis of the display states of the graphical symbols in the window 200.

Figure 2B:
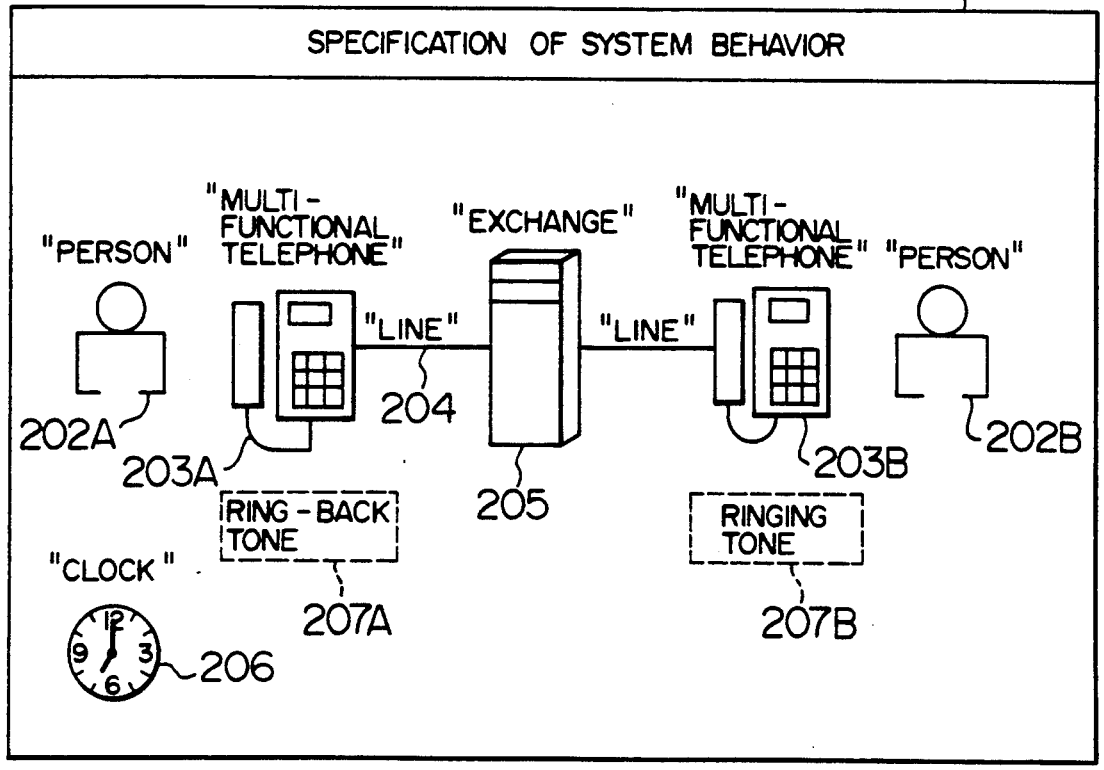
FIG. 2B shows another example of the behavior specification display screen.

Shown in FIG. 2B is another example of the display screen of the behavior specification of the real time system, which includes, in addition to the elements of FIG. 2A. graphical symbols 202A and 202B indicative of operators (persons) and a graphical symbol 206 indicative of a clock for controlling the operational timing of the program objects.

Figure 4:
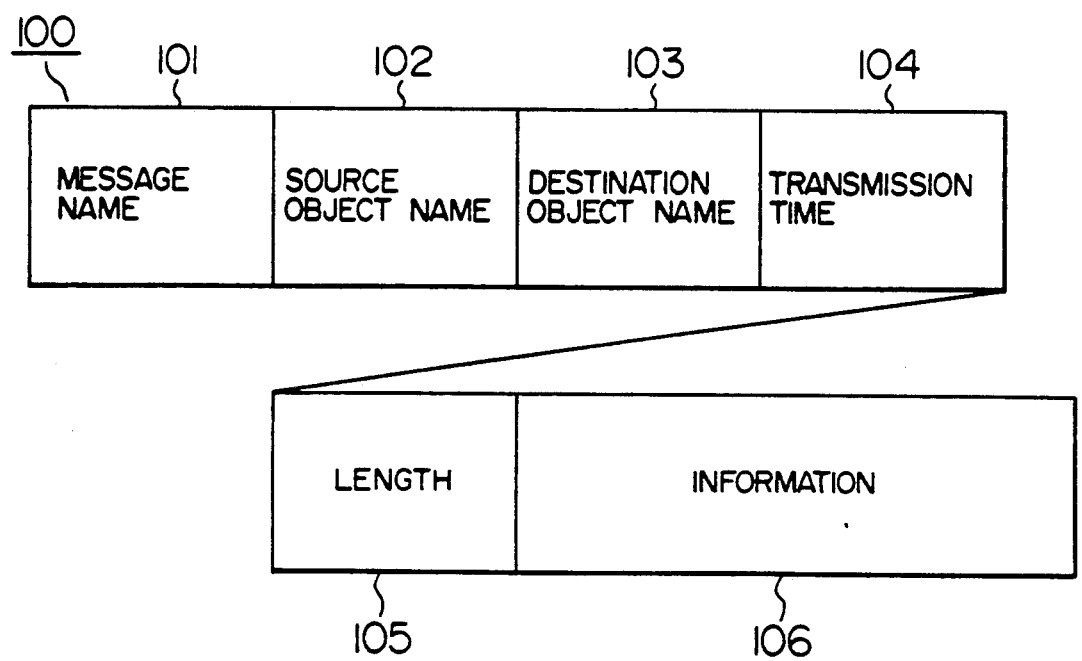
FIG. 4 is an example of a format of a message to be transferred between programs in the software configuration of FIG. 3.
Figure 3:
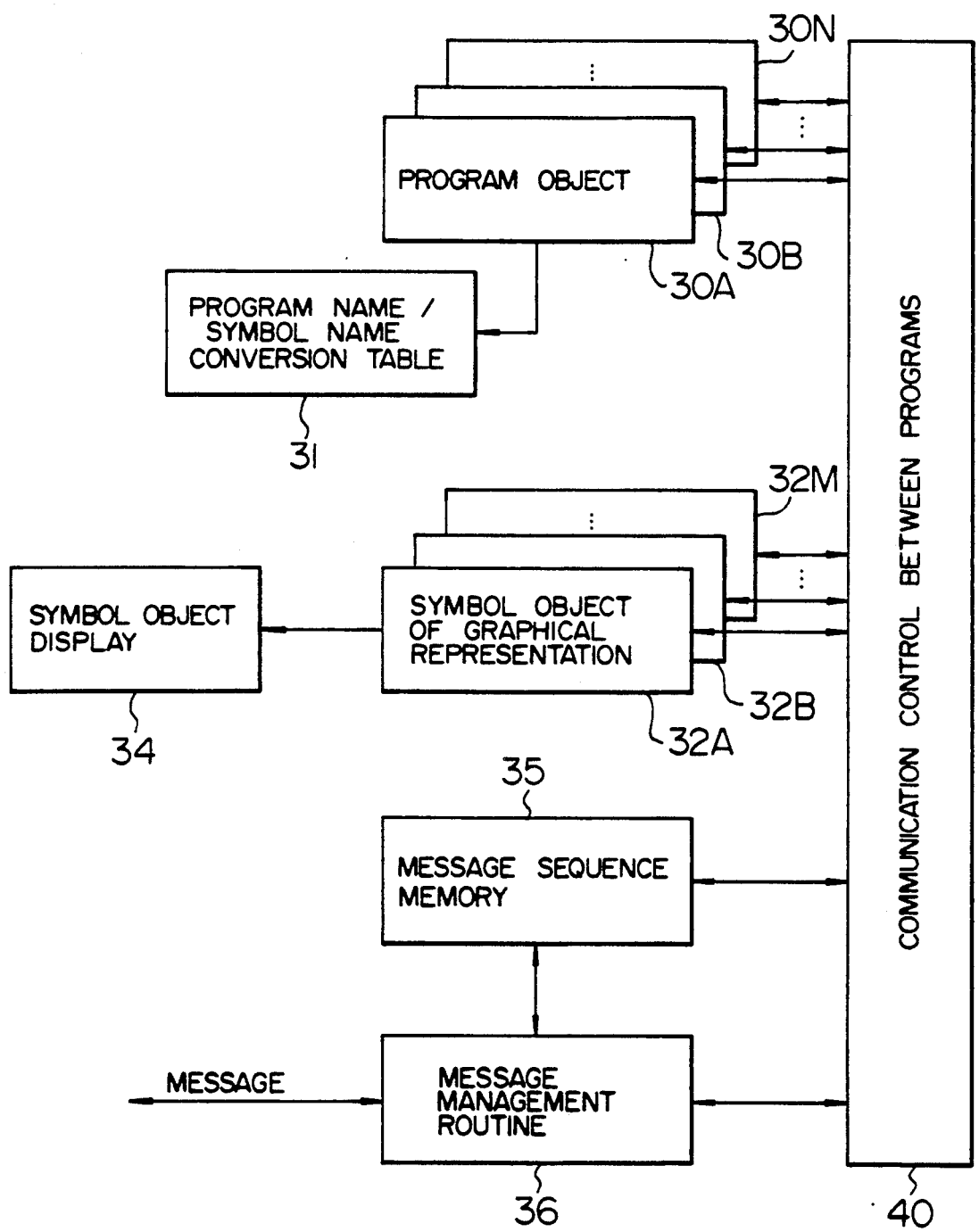
FIG. 3 shows an embodiment of a software configuration for displaying the behavior specification of the real time system.

FIG. 3 shows an exemplary software configuration of the aforementioned microprocessor (control unit) 10 to carry out the operation simulation of the above real time system and to display the system behavior specification. In the drawing, the software configuration includes programs (program objects) 30 (30A, 30B, ..., and 30N) for the simulation of operations of the respective constituent elements (objects) of the real time system, a program name/symbol name conversion table (first conversion table) 31 to be referenced to obtain a symbol object name from a program object name, programs (which will be referred to as the symbol objects, hereinafter) 32 (32A, 32B, ..., and 32M) for controlling the states of graphical symbols displayed on the display screen, a symbol object display routine 34 for displaying a graphical symbol on the display screen in response to a command issued from the symbol objects 32, a message sequence memory 35 for storing therein a sequence of pre-prepared messages to be executed by the program objects 30, a message management routine 36 for performing the writing and reading out of message into and from the memory 35, and an inter-program communication control routine 40 for performing a message communication between the program objects 30 and the symbol objects Referring to FIG. 4, there is shown an example of a format of one of the messages stored in the memory 35. Each message includes a field 101 indicative of the name of the message, a field 102 indicative of the name of an object which sends the message (which will be referred to merely as the message sender), a field 103 indicative of the name of an object which receives the message (which will be referred to merely as the message receiver), field 104 for designating the transmission time of the message, a field 105 for indicating the length of the message, and an information field 106 for containing information including a command to be executed at the message receiver object and data to be processed.

More specifically, set in the sender object name field 102 and the receiver object name field 103 are the same program object names as defined in the program name/symbol name conversion table 31 respectively. Set in the transmission time field 104 is a time for designating the execution timing of the message to allow the animation on the display screen interlinked with the behavior simulation of the real time system to be varied at such a proper time that the user can easily monitor it. For example, the time is set in the field 104 in the form of a relative time with respect to leading one of messages in series. Set in the information field 106 are, for example, the name (type) of the message, the current state of the associated objects, and various sorts of control parameters. The transmission time field 104 may be omitted and instead the transmission time may be set in the information field 106.

The messages 100 are inputted, for example, through operator's operation of the keyboard 14 or mouse 15 or through the transfer of the message data from another terminal equipment connected, e.g., via a communication network, and then stored in the memory 15 as a sequence of messages under control of the routine 16. When the user commands the behavior simulation of the real time system, this causes these messages to be sequentially read out and passed to the inter-program communication control routine 40 under control of the routine 36.

The inter-program communication control routine 40, when receiving a message 100i read out from the memory 5, determines the transmission direction of the message on the basis of the sender object name 102 and receiver object name 103 of the received message, generates a control message 100j for designating the transmission direction of the message, and passes the message 100j to symbol object (for example, 32J) controlling a graphical symbol indicative of the message transmission direction on the display screen. The routine 40 also passes the received message 100i to a program object 30I specified by the receiver object name 103 of the message.

The program object 30I when receiving the message 100i performs data processing based on the contents of the information field 106 of the received message. The program object 30I also finds the name of the symbol object corresponding to the program object by referencing the program name/symbol name conversion table 31, generates a message data 100i' necessary for changing a symbol on the display screen including the symbol object name in the destination field 103, and then passes the message data 100i' to the communication control routine 40. The newly generated message data 100i' is passed from the routine 40 to a symbol object 32L.

The symbol objects 32L and 32J generate a control message for changing the shape or color of a specific symbol on the display screen according to the contents of the respective message data 100i' and 100j and send the control message to the symbol object display routine 34. The symbol object display routine 34, when receiving the control message, updates the display contents of the window 200 according to the message, whereby the display contents of the screen is changed.

The program objects B0A to 30N execute data processings necessary for the simulation according to the contents of the information field 106 of each message received from the communication control routine 40. Depending on the data processing results, a new message directed to another object within the same terminal equipment or to an object within another terminal equipment is generated. The message data generated as directed to the program object in another terminal equipment is stored in the memory 35 as a transmission message under control of the communication control routine 40 to be transmitted to the communication network according to the message management routine 36.

In accordance with the present invention, for the purpose of changing the state of symbols on the display screen according to the data processing results executed by the program objects 30A to 30N, each program object 30I activated by a message references the program name/symbol name conversion table 31 to find a symbol name corresponding to the associated program object, and generates a message directed to a symbol object 32*i* for management of the state of a screen display object having the above symbol name. The generated message is passed through the communication control routine 40 to the symbol object 32*i*. The symbol object 32*i*, when receiving the message, generates a control data for changing the display state of the symbol on the display screen according to the contents of the received message and applies the control data to the symbol display routine 34.

FIG. 5 shows an example of a specific structure of one of the program objects 30. In the present embodiment, each object 30 is described in an object-oriented language. In the drawing, a description 301A states the definition of a program object on an exchange and a description 301B state the definition of a program object on a multifunctional telephone set. The description 301A includes a program name "EXCHANGE/P" 302A and several slots 303A making up the data memory. Similarly, the program object definition 301B includes a program name "MULTIFUNCTIONAL-TELEPHONE/P" 302B and several slots 303B. A description 305 states an exemplary definition of the operational contents of the exchange object 301A. The illustrated example is defined so that, the exchange, when receiving a message indicative of an off-hook request from the multifunctional telephone object 301B, transmits a message indicative of acceptance of the off-hook request to the multifunctional telephone object 301B. In actual applications, more detailed operations and actions on devices corresponding to the respective objects are described in the aforementioned operational definition 305.

Figure 6:
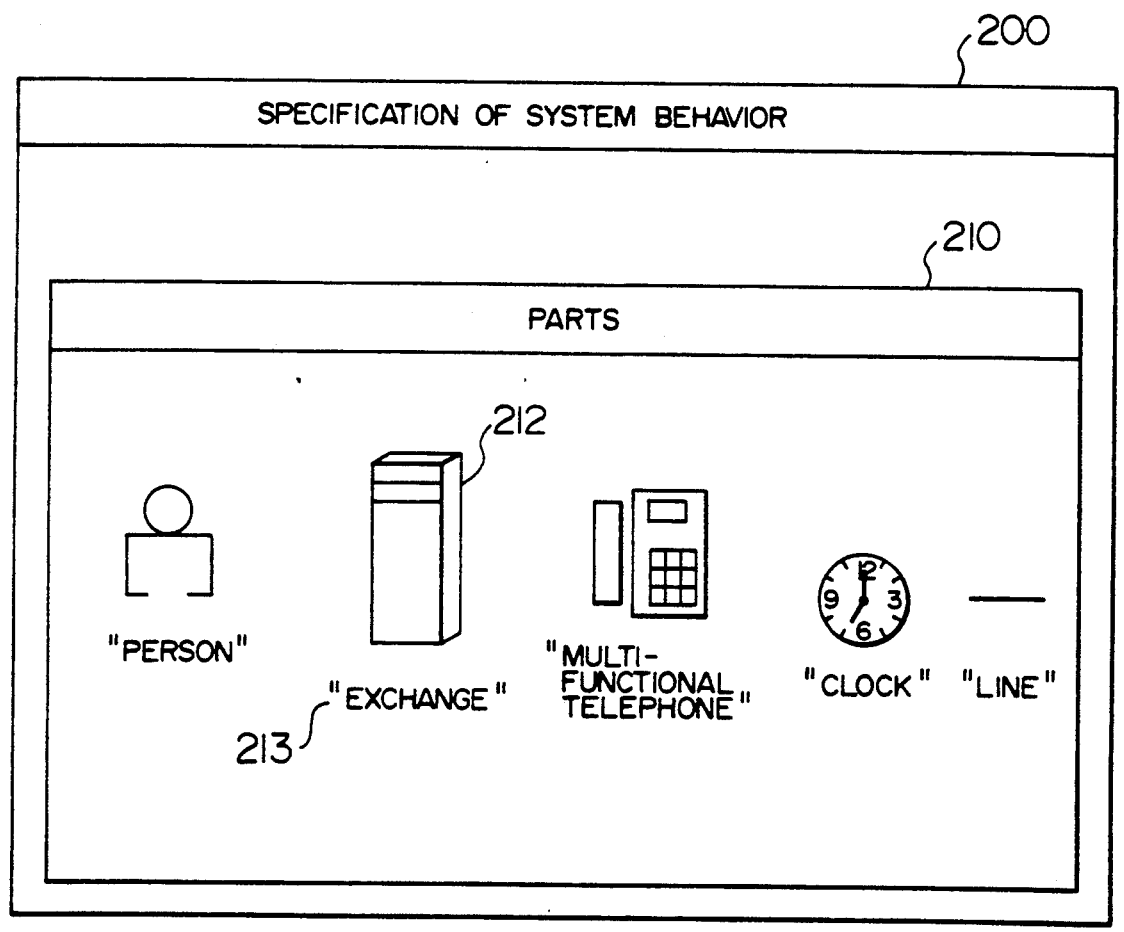
FIG. 6 is an example of a window display for defining graphical symbol objects.

Shown in FIG. 6 is an example of a window utilized to define the symbol graphic object 32. In this case, reference numeral 210 denotes a part display window for displaying defined symbol objects therein. Shown, in the present embodiment, in the window 210 are a symbol graphic object 212 and a symbol graphic name 213 defined for each object indicative of the exchange, multifunctional telephone set and line handled in the exchange system. With respect to each symbol graphic object 212, a plurality of sorts of graphics corresponding to the different states of the system, e.g., corresponding to different colors and shapes are previously defined. Further when other additional objects such as the clock 206 or the person 202 shown in FIG. 2B are required on the system behavior specification display screen, these objects are also defined in the part display window 210.

Data indicative of each symbol graphic object 212 and symbol graphic name 213 defined in the above part display screen are stored as part of the respective symbol objects 32A to 32M so that, when the above symbol object 32*i* is activated, the symbol corresponding to the system state is combined with its name and then output into the behavior specification display window 200 through the symbol display routine 34. As a result, the static specification of the exchange system is displayed on the display screen.

Referring to FIG. 7, there is shown an exemplary structure of the program name/symbol name conversion table 31. The above table 31 shows pairs of names 310 of the program objects 30 (program names 310) and names 311 of the symbol objects 32 (symbol names 311) corresponding to the respective program objects 30. That is, on the basis of the name 310 of the program object 30, the name 311 of the symbol object 32 corresponding to the program object 30 can be searched in the table 31. The above program names 310 include, for example, such a program name 302 shown in FIG. 5, while the above symbol names 311 include, for example, such symbol names 208 as shown in FIG. 2A (or such symbol names 213 as shown in FIG. 6).

Figure 8:
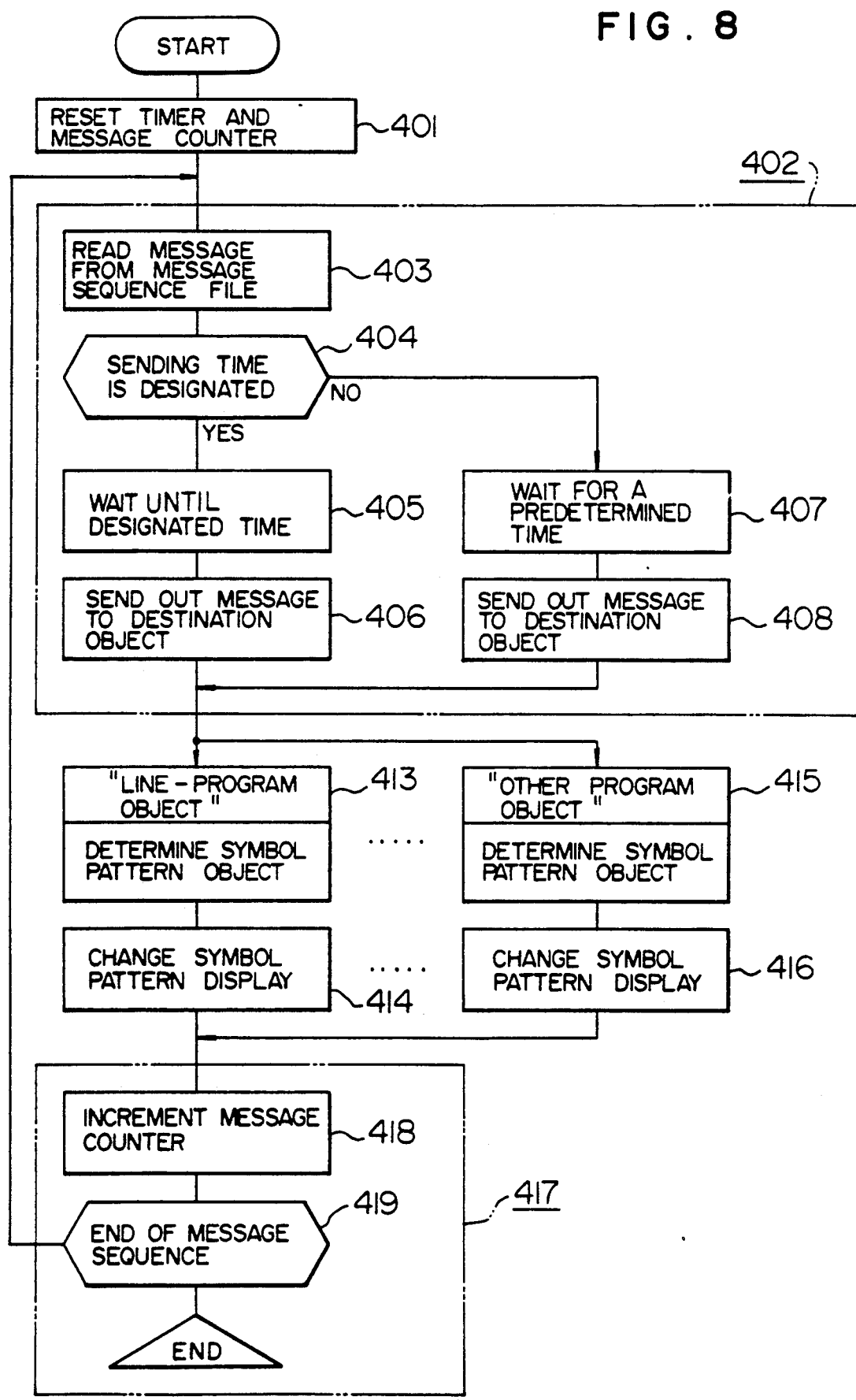
FIG. 8 is a flowchart for explaining the major operation of the invention for the behavior specification display of the real time system.

FIG. 8 shows a flowchart for explaining the basic operation of the inter-program communication control routine 40 which passes a message sequentially read out from the message memory 35 to the program object 30*i* designated by the object transmission receiver name 103 of the related message and transmits the processing result or state change of the activated program object 30*i* to the symbol object 32*i* to thereby display the behavior of the real time system dynamically in the window 200.

In FIG. 8, more in detail, a step 401 and steps 402 and 417 enclosed by broken lines are executed by the inter-program communication control routine 40; while steps 413 to 416 are executed by the program objects 30 or the symbol objects 32. It is assumed herein for convenience of explanation that all of the program objects 30 (30A to 30N), symbol objects 32 (32A to 32M) and program name/symbol name conversion table 31 necessary for the display of the behavior specification of the real time system are previously defined and a series of message data necessary for operating the system are previously stored in the memory 35.

Step 401: The control routine 40 initializes a timer TM and a counter CT showing a message data being processed.

Steps 402: The control routine 40 reads out the message data shown on the counter CT from the memory 35 (step 403) and checks whether or not a transmission time is designated in the transmission time field 104 of the message (step 404). The control routine 40, when determining the presence of the designated transmission time, waits until the time of the timer TM coincides with the designated transmission time (step 405). Determination of non-designation of the transmission time causes the control routine 40 to wait for the passage of a predetermined time (step 407) and then to send out the above message (steps 406 and 408).

In the sending out of the message, the control routine 40 first judges the transmission direction of the message on the basis of the sender object name 102 and receiver object name 103 of the message, and passes a copy of the message to a line program object, e.g., 30L corresponding to a line symbol connecting between the sender and receiver object symbols and to display the message direction. Further, the control routine 40 passes the above message to one, e.g., 30J of the program objects designated by the receiver object name 103 of the message.

Step 413: The line program object 30L having received the message data judges the flow direction of the message on the basis of the sender object name 102 and the receiver object name 103 with respect to the received message and references the program name/symbol name conversion table 31 to find the name 311 of the symbol object corresponding to the line symbol. Next, the line program object 30L edits a message data including an instruction data for indicating on the screen the message transmission direction directed to the symbol object designated by the name 311. e.g., to the symbol object 32K and passes it to the inter-program communication control routine 40. The control routine 40 passes the above message data to the designation symbol object 32K.

Step 414: The symbol object 32K applies to the symbol display routine 34 a control data for changing the symbol display on the screen according to the information 106 contained in the received message and then returns control to the inter-program communication control routine 40.

Step 415: The program object 30J also performs data processing based on the contents of the received message, references the program name/symbol name conversion table 31 to find the name 311 of the symbol object, edits a message for instructing the change of the symbol display directed to the symbol object designated by the above name. e.g., to the symbol object 32J. and passes it to the inter-program communication control routine 40.

Step 416: The symbol object 32J applies a control data for the symbol display change to the symbol display routine 34 and then returns control to the inter-program communication control routine 40.

Step 417: The inter-program communication control routine 40 increments the value of the counter CT for showing the message data to be processed (step 418) and when the message data to be processed is present in the memory 35, repeats the aforementioned operation. The absence of the message to be processed in the memory 35 causes the control routine 40 to terminate its operation.

Although a series of message data prescribing the behavior of the real time system have been previously stored in the memory 35 in the foregoing embodiment, message data collected by another device such as, for example, a host computer or an actual exchange as these message data may be input through the communication network and be stored into the memory 35 through the information storage routine 36. In the latter case, a message sequence edited in distributed environments can also be processed as in the above case through the steps 401 to 417 to display the system behavior specification on the display screen.

Explanation will next be made of a second embodiment of the present invention.

Figure 9:
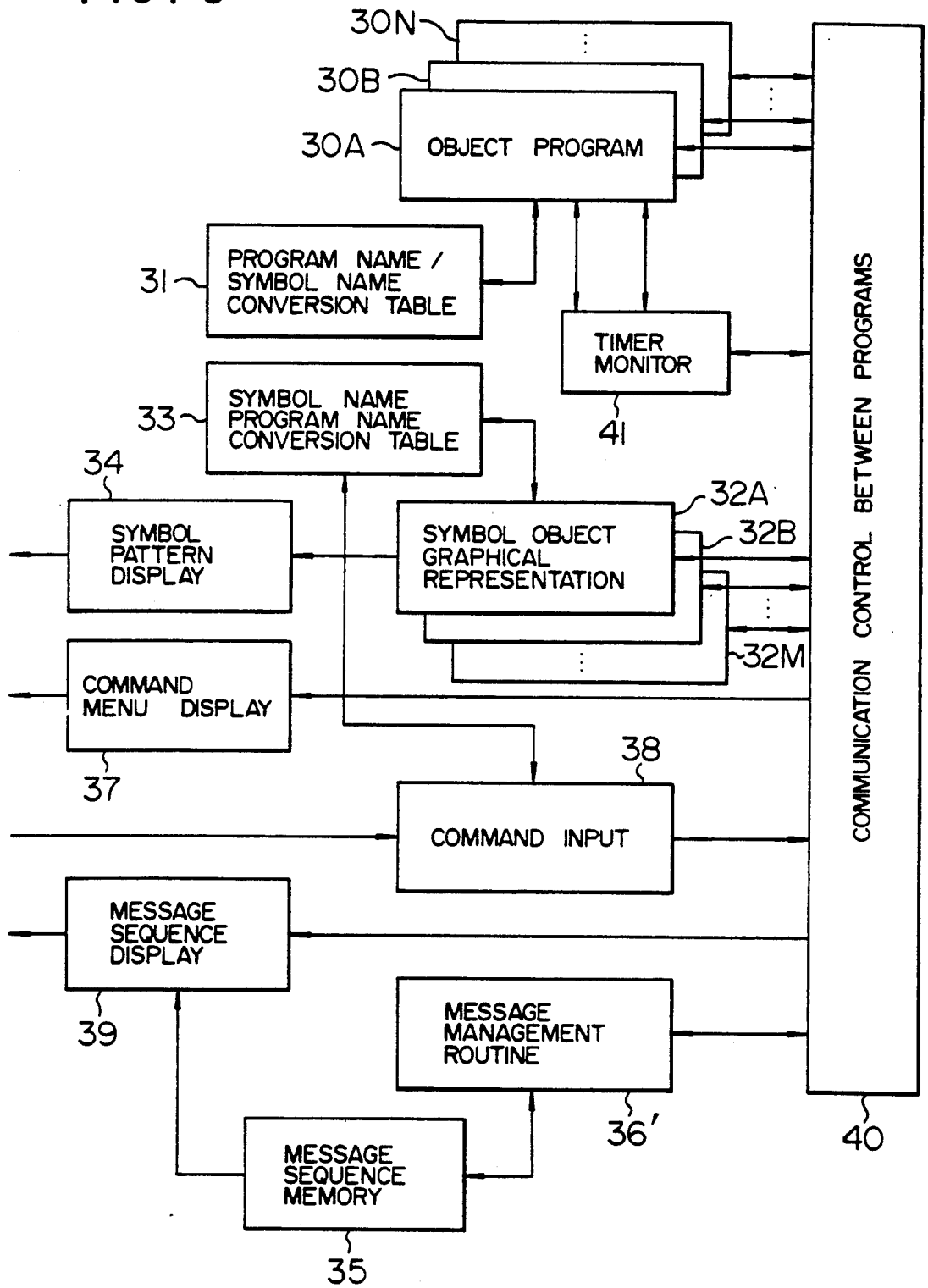
FIG. 9 shows another embodiment of the software configuration for the behavior specification display of the real time system.

FIG. 9 shows another embodiment of the software configuration for the behavior simulation of the real time system and for its behavior specification.

The illustrated software configuration includes, in addition to the program modules shown in FIG. 3, a symbol name/program name conversion table (second conversion table) 33 to be referenced by the symbol object 32 to obtain a program object name from a symbol object name, a command display routine 37 for displaying a command menu for presentation of operator commands allowing user's selection, a command input routine 38 for accepting operation of an operator command entered by the user, a timing supervisor routine 41 for timer monitoring, and a message sequence display routine 39 for graphical representation of a sequence of message communication. The symbol name/program name conversion table 33 is also referenced by the command display routine 38.

The program objects 30 (30A to 30N) and the symbol objects 32 (32A to 32M) execute their data processing operation according to the message received from the inter-program communication control routine 40 and if necessary, transmit one or more new messages to other objects. As a result, a plurality of objects are operated as linked with each other and thus the operation of the entire real time system is controlled. Some of the program objects B0 store therein log information indicative of one state to be next executed or one state already executed according to a predetermined operational sequence, judge with use of this log information the type of a message to be next accepted or the type of a command to be next accepted, and display it in the command menu.

Shown in FIG. 10 is an example of the structure of the symbol name/program name conversion table 33. The table 33 shows pairs of names 311 of symbols and program names 310 of program objects. The name 310 of a program object can be obtained from the corresponding symbol name 311. The symbol names 311 include the symbol names 208, while the program names 310 include the program names 302.

Figure 11:
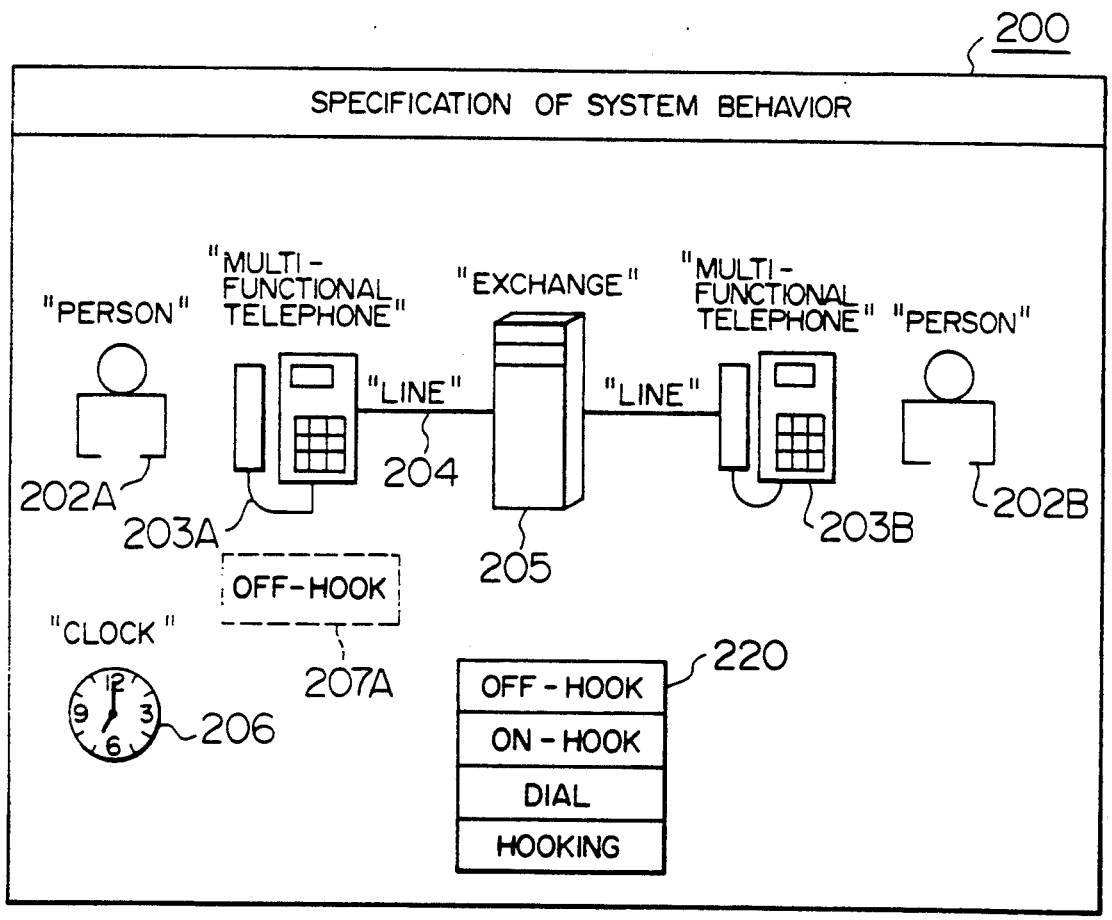
FIG. 11 shows an example of a command menu display.

Referring to FIG. 11, there is shown an example of a command menu 220 to be used for the user to select operator command for indicating an object. The command menu 220 is displayed in the behavior specification display window 200 when the user selects any one of symbols appearing in the window 200.

For example, when the user selects the symbol 202A, the displayed command menu 220 includes four sorts of commands "OFF-HOOK", "on-hook", "DIAL" and "HOOKING" indicative of the types of operations for the telephone set. When the user selects one, e.g., "OFF-HOOK" of these commands in the menu by moving a cursor onto the "OFF-HOOK" representation with use of a mouse, this causes the command input routine 38 to issue a command message indicative of the "OFF-HOOK" via the communication control routine 40 to the program object (e.g., 30B) corresponding to the symbol 202A. As a result of the execution of the program object 30B, a message 207 indicative of the multifunctional telephone in its off-hook state on the display screen. Further, a time required for the above operation is indicated by a clock 206 as necessary.

Figure 12:
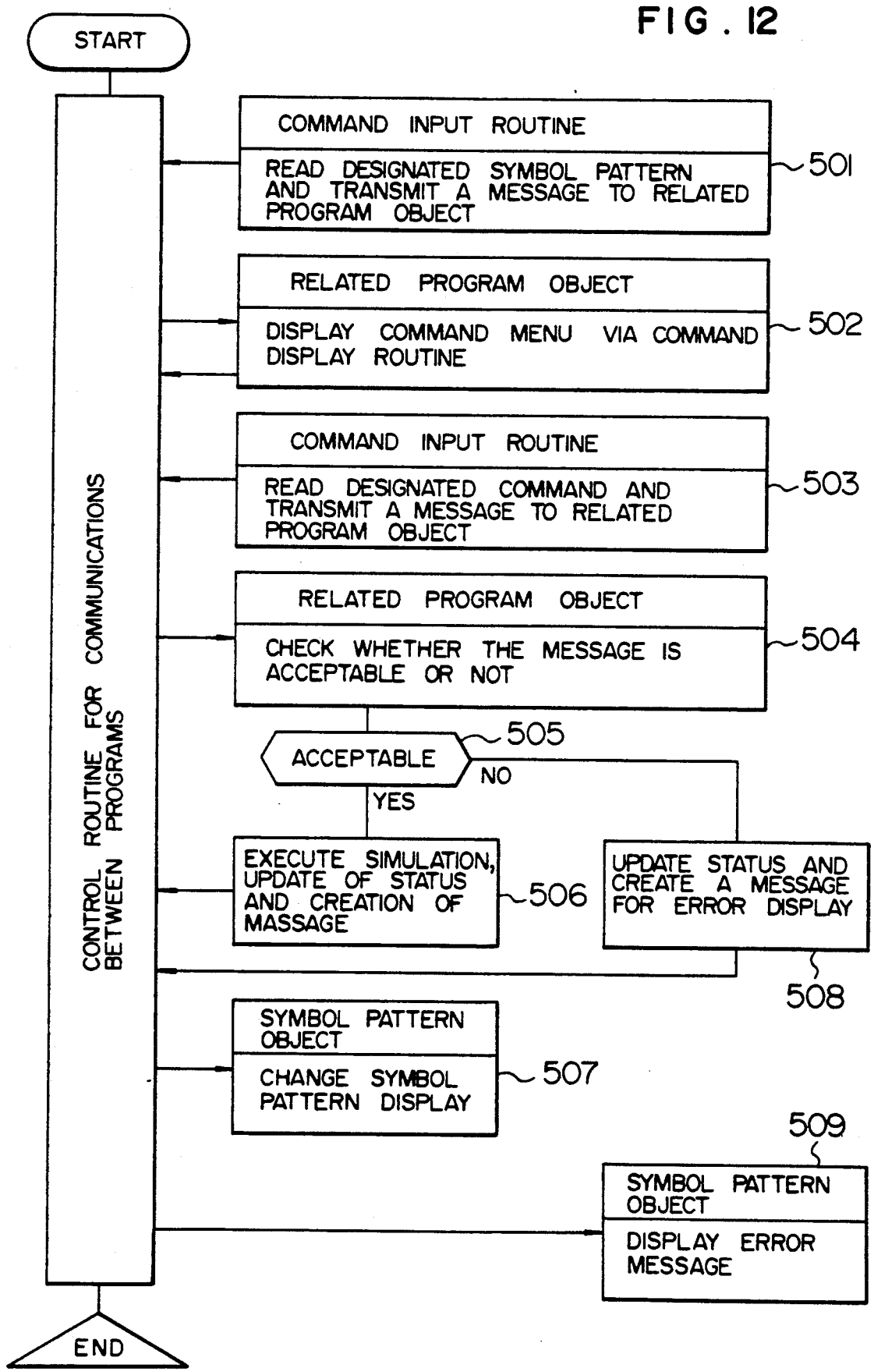
FIG. 12 is a flowchart for explaining another form of operation of the invention for the behavior specification display of the real time system.

FIG. 12 shows a program flowchart for dynamic display of the behavior state of the real time system on the display screen when user's input operations cause activation of any one of the program objects 30A to 30N and also change of the symbols 202 to 206.

Step 501: When the user selects one of the symbols on the display screen with use of the mouse, the command input routine 38 identifies the selected graphical symbol and then references the symbol name/program name conversion table 33 to find the program object name 310 corresponding to the above symbol name. For example, when the user selects the graphical symbol 202A indicative of a person, the command input routine 38 extracts from the second conversion table 33 the program object (e.g., 30C) for controlling the command menu, generates a message to be directed to the program object 30C, and passed it to the communication control routine 40. How the communication control routine 40, when receiving the above message from the command input routine 38, performs its message receiving and transmitting operations will be detailed later.

Step 502: The program object 30C having received the above message through the communication control routine 40, determines a group of command candidates (command menu) next acceptable by the user on the basis of log information currently being stored in its own routine 40 and sends a message indicative of the command menu to the command display routine 37 through the communication control routine 40. As a result, the command display routine 37 causes the command menu 220 to be displayed in the behavior specification display window 200.

Step 503: When the user selects any one of the commands in the above command menu 220, the command input routine 38 identifies the selected command and transmits a message having the selected command set in its information field to the program object 30C through the communication control routine 40.

Steps 504 and 505: The program object 30C, when receiving the above message, checks whether to be able to accept the above message on the basis of log information stored in its own.

Step 506: The program object 30C, when determining to be able to accept the message, performs its simulating operation based on the contents of the received message, updates the log information and if necessary, generates a message to be transmitted to other program or symbol objects.

For example, if the user selects the command "OFF-HOOK", the program object 30C generates a message indicative of an off-hook instruction to be directed to the program object (e.g., 30D) for simulating the operation of the telephone set, and passes the message to the communication control routine 40.

The program object 30D, when receiving the aforementioned off-hook command message through the communication control routine 40, generates a message telling an off-hook to be directed to the program object (e.g., 30E) for simulating the exchange, passes the off-hook telling message to the communication control routine 40, references the program name/symbol name conversion table 31 to find the name (e.g., 32D) graphical object indicative of the telephone set corresponding to the program object 30D, and transmits a message indicative of the change to the off-hook state to the symbol object 32D through communication control routine 40.

Step 507: The symbol object having received the message generates a control message for changing the display state of one symbol on the display screen according to the contents of the received message and provides it to the symbol display routine 34. For example, in the case of the aforementioned telephone symbol object 32D, the object 32D provides to the symbol display routine 34 a control message for changing the telephone symbol 203A on the display screen from its "ON-HOOK" state to "OFF-HOOK". This causes change of the state of the symbol 203A on the display screen. Further, since the transmission of the message from the telephone to the exchange is reflected in the display screen, the state of the display screen varies depending on the transmission of a message between the program objects.

Step 508: The program object 30C, when determining the impossible acceptance of the message at that time, fails to perform the data processing operation designated by the received message, updates the log information, references the program name/symbol name conversion table 31 to find the name of the symbol object 32C, and transmits a message indicative of occurrence of a message error to the symbol object 32C through communication control routine 40.

Step 509: The symbol object 32C having received the error message sends to the symbol display routine 34 a control message to display the error message. This causes the error message to be displayed in the window 200 at a predetermined location.

In the case where the program object having received the message from the communication control routine 40 generates, as the data processing result executed in the step 506, a new message to be directed to another program object, the aforementioned steps 504 to 507 or the step 508 and 509 is repeated in response to the new message.

Figure 13:
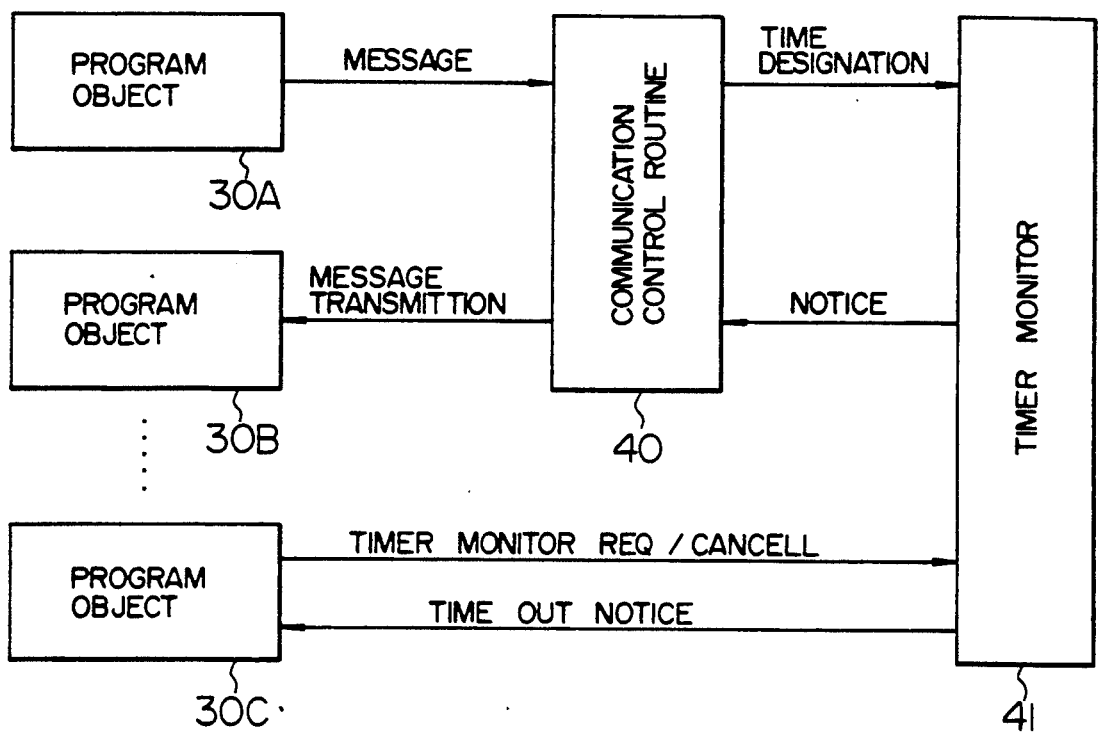
FIG. 13 is a diagram for explaining a timer monitoring function in inter-program communication.

Explanation will then be made as to the functions of the timer monitor routine 41 by referring to FIG. 13. The timer monitor routine 41 has functions of sending a message to the program or symbol object designated by the message at its designated time and of detecting the time-out of the designated timer monitor time.

For example, assume that a message is to be sent from the program object 30A to the program object 30B. Then the program object 30A as a sender first generates a message having a message name set in the message format 100 of FIG. 2, the name (or program ID) of the sender program object 30A set in the field 102, the name of the destination program object 30B set in the field 103 and a transmission designation time set in the field 104 (or information field 106); and sends the message to the communication control routine 40. The communication control routine 40 checks whether or not the transmission time is designated in the received message. The communication control routine 40, when determining the transmission time designated in the received message, stores the received message in the memory, and issues to the timer monitor routine 41 a time expiration notification request indicative of designation of both a message identifier (e.g., message name or sequential number) and a time.

When the designated time expires, the timer monitor routine 41 sends a time expiration notification including the above message identifier to the communication control routine 40. The communication control routine 40 reads out from the memory a message having an identifier designated by the time expiration notification and passes the message to the program object 30B specified by the destination field 109 of the message.

The transmission time may be designated in terms of an absolute time or a relative time with respect to the processing time of the first message as a reference time. Further, when timer monitoring based on the data processing of a certain program object is necessary, the time expiration notification request is issued from the program object directly to the timer monitor routine 41.

Explanation will next be made as to the generating operation of a message sequence carried out by the communication control routine.

The communication control routine 40 selects only messages to be transmitted and received between the program objects from a plurality of received messages and generates and stores a message sequence in the memory 35. The message sequence do not include the messages to be transmitted and received between the program objects 30 and symbol object 32.

The communication control routine 40, when receiving a message from any one of the routines, checks the message sender 102 and the message receiver 103 in the received message to confirm whether or not the message is to be transmitted and received between the program objects 30. If determining the message to be transferred between the program objects, then the communication control routine 40 generates a copy of the received message and passes the copy message to a message management routine 36'. The received message itself, as mentioned earlier, is passed to the program object specified in the message receiver 103 at timing corresponding to the designated transmission time.

The message management routine 36' managing the number NM of such copy messages as received from the communication control routine 40, increments the value of the message number NM, attaches the message number to the received message as a sequential number and sequentially stores it in the message sequence memory 35, each time the routine 36' receives a new message.

Figure 14:
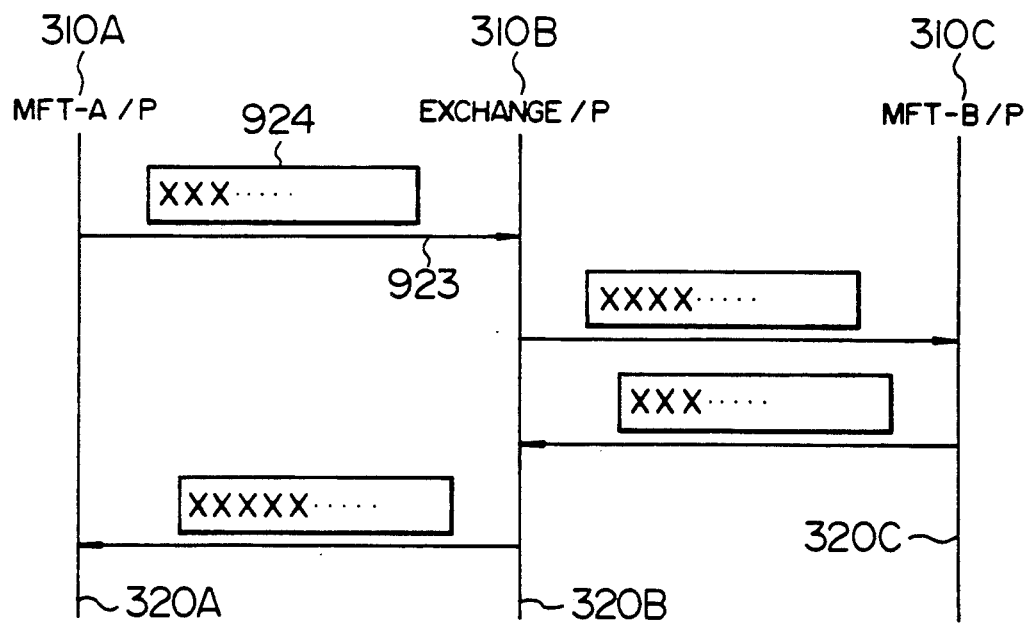
FIG. 14 shows an example of a message sequence display.

Shown in FIG. 14 is an example of a graphical representation of the message sequence to be displayed on the display screen under control of the message sequence display routine 39.

The message sequence display routine 39, when the user issues a message sequence display request, sequentially reads out a series of messages stored in the message sequence memory 35; and registers in a work table a relationship between the names of the two program objects designated in the message sender and message receiver fields 102 and 103 of each message, the transmission direction of the message between the objects, and the message name extracted from the field 101.

When the data registering operation of all the messages in series into the aforementioned work table is completed, as shown in FIG. 14 for example, the mutually different program object names 310A, 310B, 310C, . . . are arranged at regular intervals in a horizontal axis direction, boundary lines 320A, 320B, 320C, . . . are arranged below the respective program object names, the respective messages are generated on the display screen in the form of a message sequence diagram expressed by message names M1, M2, . . . and by arrow symbols D1, D2, D3, . . . starting from the message sender objects as start points and ending in the message receiver objects as end points, on the basis of the data registered in the work table. On the above message display, positions on the vertical axis are changed according to the sequential numbers of the messages to arrange one arrow symbol on one line, whereby the message transmission manner is expressed in a time series manner.

A validated message sequence (S1) is previously stored in one of regions of the message sequence memory 35, and a message sequence (S2) generated when the program object is actually executed is previously registered in the other region of the memory 35 under control of the communication control routine 40, so that the two sequences (S1 and S2) are displayed on the display screen at the same time or selectively under control of message sequence display routine 39, whereby validation when the program object is changed or modified can be facilitated. In this case, a difference between the message sequences (S1 and S2) may be detected to display the difference information under control of the message sequence display routine 39.

As will be clear from the foregoing explanation, in accordance with the present invention, a plurality of routines (program objects) prescribing the operations of objects to be handled in the real time system as well as a plurality of routines (symbol objects) for changing the display states of symbols corresponding to these program objects according to the operational states of the objects are linked with each other so that the graphical symbols on the display screen can be displayed with animation, which results in that the system behavior specification can be visually and easily confirmed.

Further, when messages to be transmitted or received between objects are previously stored in a memory on a time series basis and later read out from the memory, a message sequence transmitted or received between the objects can be displayed on the display screen in a graphical representation manner or the simulated operation of the real time system can be displayed on the basis of the message sequence.

When state or log information is provided to each program object, the next acceptable commands can be checked or a menu for the next acceptable commands can be presented to the user, whereby the real time system can be reliably operated through user's input command or in actual applications.

When it is desired to utilize the present invention for the purpose of allowing a customer to have the operation or function of the real time system understood, a transmission or execution time is previously designated for each of pre-prepared messages in a message sequence to pass each message to the associated destination program object, whereby the presentation of the system behavior on the display screen can be realized at a speed slower than the actual operation of the real time system, thus facilitating customer's understanding thereof.

What is claimed is:

1. An equipment for observing a behavior of a real time system in real time and sequentially displaying the behavior, the equipment comprising:

a display screen;

program memory means for storing a plurality of simulation program modules, symbol representation program modules and an inter-program communication control routine, each of said simulation program modules including a function of: i) defining an operation of one of a plurality of objects representing said real time system components and relationship between said one of said objects and at least one other of the plurality of objects of the real time system and ii) simulating the operation of said one of said objects according to contents of an operation control message for simulating the behavior of the real time system applied from said inter-program communication control routine, each of said symbol representation program modules including a function for displaying on the display screen an operational state of one of said objects of a relationship between said one of the objects and at least one other of the plurality of objects of said real time system in a form of a pictorial graphical symbol, respectively, said inter-program communication control routine including a function for reading an operation control message from said program memory means and distributing said operation control message to at least one of said simulation program modules selected in accordance with destination information included in the operation control message;

memory means for storing in a predetermined sequence therein a plurality of operation control messages each including destination information to designate one of said simulation program modules by which the operation control message is to be processed; and, processor means for reading out said operation control messages one by one from said memory means and for selectively executing said inter-program communication control routine, said simulation program modules and said symbol representation program modules, wherein each of said simulation program modules includes a function of generating a symbol control message to inform a specific one of said symbol representation program modules corresponding to the simulation program module of an object state change caused by a result of simulation operation of the simulation program module executed when receiving an operation control message from said inter-program communication control routine, said symbol control message being supplied to said specific one of said symbol representation program modules via said inter-program communication control routine so that said specific one of said symbol representation program modules changes the operational state of the associated one of said pictorial graphical symbols presented on said display screen according to contents of the symbol control message.

2. An equipment for displaying a specification of behavior of a real time system as set forth in claim 1, further comprising:

conversion table means for defining relationships between said simulation program modules and said symbol representation program modules, wherein each of said simulation program modules includes means for referring said conversion table means to determine said specific symbol presentation program module corresponding thereto and generating said symbol control message with destination information designating the specific symbol representation program module.

3. An equipment for displaying a specification of behavior of a real time system as set forth in claim 1, wherein:

each of said operation control messages includes a source name indicative of a message sender and a destination name indicative of a message receiver, and said inter-program communication control routine includes means for distributing said operation control message and a copy thereof to one of said simulation program modules designated by said destination name and another one of said simulation program modules determined in accordance with a combination of said destination name and said source name of said operation control message.

4. An equipment for displaying a specification of behavior of a real time system as set forth in claim 1, wherein said inter-program communication control routine includes means for distributing, when said operation control message contains a transmission time designation data, the operation control message to one of said simulation program modules at a timing corresponding to said transmission time.

5. An equipment for displaying a specification of behavior of a real time system as set forth in claim 1, wherein said inter-program communication control routine includes a function for reading out said operation control message one by one from said memory means so as to pass each control message to one of said simulation program modules at regular time intervals.

6. An equipment for displaying a specification of behavior of real time system as set forth in claim 1, wherein:

said inter-program communication control routine includes means for generating a direction symbol control message to be supplied to one of said symbol representation program modules for controlling a symbol indicative of message transmission direction on said display screen, said direction symbol control message designating a direction of control signal transmission determined by a source object name and a destination object name included in the operation control message, and the symbol representation program module having received said direction symbol control message presents an indication of a control signal transmission direction on the display screen.

7. An apparatus for observing a behavior of a real time system in real time and sequentially displaying the behavior, on a display screen, the apparatus comprising:

a data processor executing processing to display said behavior of the real time system on the display screen;

a plurality of simulation program objects each defining an operation of a specific one of a plurality of components of said real time system, and a relationship between said specific one of said components and at least one other components of the real time system and each of said plurality of simulation program objects having a function to simulate the operation of said specific one of said components according to a given operation control message for simulating the behavior of the real time system applied from said inter-program communication control routine;

a plurality of symbol representation program objects each functioning to represent one of an operational state of a specific one of said components of said real time system and a relationship between the specific one of said components and at least one of the other of said components on the display screen in a form of a pictorial graphical symbol;

communication control program having a function of performing message communication with said simulation program objects and said symbol representation program objects;

command menu display program object for providing on the display screen a presentation of a command menu for use in selection of an operation command or a symbol of an operation command by a user; and, a command issue program object for issuing the operation command message for simulating the behavior of the real time system applied from said inter-program communication control routine indicative of said operation command selected among said command menu on the display screen by the user, said operation command message including destination information for indicating one of said plurality of simulation program objects by which the operation command message is to be processed, wherein said communication control program operates to receive the operation command message from said command issue program and to distribute the operation command message to one of said simulation program objects specified by the destination information of the operation command message, each of said simulation program objects includes a module means for generating, when receiving the operation command message from said communication control program, a new operation control message to e processed by another one of said simulation program objects and/or a symbol control message to be processed by specific one of the symbol representation program objects which controls a representation of a symbol corresponding to a specific one of said components on which an operational state change is caused by a result of simulation operation executed according to the operation command message, said new operation control message and said symbol control message being supplied to said another one of said simulation program objects or said specific one of said symbol representation program objects via said communication control program, and respectively, whereby said specific one of said symbol representation program object changes the operational state of associated one of the pictorial graphical symbols on said display screen according to contents of the symbol control message.

8. An apparatus as set forth in claim 7, further comprising memory means in the real time system of sequentially storing the operation control messages generated through execution of a simulation operation by said simulation program objects.

9. An apparatus as set forth in claim 8, further comprising means for outputting the operation control messages stored in said memory means to said display screen in a time-series, graphical representation.

10. An apparatus as set forth in claim 7, wherein each of said simulation program objects includes:

means for storing log information indicative of at least one of a previously executed said operational state and the operational state to be subsequently executed according to a predetermined operational sequence, and means for judging whether to process the operation control message received from said communication control program by referring to said log information.

11. An apparatus as set forth in claim 10, wherein each of said simulation program objects includes means of generating a notification message indicative of a notification of an impossibility of a processing of the operation control message, whereby one of the symbol representation program objects receiving said notification message via said communication control program operates to present an error message on said display screen.

12. An apparatus as set forth in claim 10, wherein:

each of said simulation program objects includes means for generating a menu control message indicative of a group of commands permitted for next input by the user based upon said log information, and said command menu display program objects include means for displaying the command menu on said display screen according to the menu control message.

13. An apparatus as set forth in claim 7, wherein:

each of said simulation program objects includes a function for designating a time for said operation control message generation by the simulation program object, and said communication control program includes a function for distributing the operation control message to another one of said simulation program objects at said designated time.

14. A computer implemented method for observing a behavior of a real time system in real time and sequentially displaying the behavior on a display screen with use of a data processor including: i) a plurality of simulation program modules, each defining an operation of a specific one of a plurality of components of said real time system and a relationship between said specific one of the components and at least one of the other of said components of the real time system and each of said plurality of said simulation program modules having a function to simulate the operation of said specific one of the components according to contents of an operation control message for simulating the behavior of the real time system applied from said inter-program communication control routine, ii) a plurality of symbol representation program modules each having a function to present one of an operational state of one of said plurality of components and a relationship between the components and at least said one of the other of said components on the display screen in a form of a pictorial graphical symbol, and iii) a control routine for communicating operation control messages with said simulation program modules, said method comprising the steps of:

providing a first operation control message from said control routine to a first one of said simulation program modules determined by destination information embedded in the first operation control message;

executing a simulation operation by said first one of said simulation program modules according to said contents of said first operation control message and generating by said first one of said simulation program modules a symbol control message indicative of an operational state change of said specified one of said components caused by execution of said simulation operation;

providing said symbol control message to a first one of the symbol representation program modules related to said first one of said simulation program modules, via said control routine; and, changing, by first one of the symbol representation program modules, the operational state of one of pictorial graphical symbols corresponding to said specified one of said components on the display screen according to the contents of said symbol control message to represent a visual image of the real time system in the display.

15. A computer implemented method for simulating behavior of a real time system as set forth in claim 14, further comprising the steps of:

issuing a second operation control message from said first one of said simulation program modules to a second one of said simulation program modules through the simulation operation based on said first mentioned operation control message;

providing said second operation control message to said second one of said simulation program modules via said control routine;

executing a simulation operation by said second one of said simulation program modules according to the contents of said second operation control message and generating, by said second one of said simulation program modules, a second symbol control message indicative of the operational state change of second one of said components caused by execution of said simulation operation;

sending said second symbol control message to a second one of said symbol representation program modules related to said second one of said simulation program modules; and changing, by said second one of said symbol representation program modules, the operational state of a second one of pictorial graphical symbols corresponding to said second one of said components on the display screen according to the contents of said second symbol control message.

16. A computer implemented method for simulating behavior of a real time system as set forth in claim 15, further including:

providing said data processor with a conversion table means for storing relationships between said simulation program modules and said symbol representation program modules, and referencing said conversion table means with each of said simulation program modules to determine one of the symbol representation program modules for which said symbol control message is issued.

17. A computer implemented method for simulating behavior of a real time system as set forth in claim 15, further comprising:

providing each of said operation control messages and said symbol control messages with a first object name indicative of a source of the message and a second object name indicative of a destination of the message, and distributing, with said control routine, each of said operation control messages and said symbol control messages generated by one of the simulation program modules to one of the other simulation program modules and symbol representation program modules in accordance with said first object name of the operational control message and the symbol control message.

18. A computer implemented method for simulating behavior of a real time system as set forth in claim 15, further comprising providing said second operation control message with a transmission time designation data, and executing said control routine to delay the distribution of the second operation control message until time reaches said transmission time.

19. A computer implemented method for observing a behavior of a real time system in real time and sequentially displaying the behavior on a display screen with use of data processor provided with a plurality of simulation program modules each defining operation of a specific one of a plurality of components of said real time system represented by a component object and a relationship between the component object and at least one of the other component objects and having a function to simulate the operation of the specific one of the components according to contents of an operation control message for simulating the behavior of the real time system applied from said inter-program communication control routine, a plurality of symbol control program modules each having a function to present an operational state of each of said components or a relationship between the component and at least one of the other components on said display screen in a form of a pictorial graphical symbol, a menu control program module for outputting a command menu to said display screen, a command control program module for issuing operation control messages each including an operation command which depends on input operations on the display screen by a user, and an inter-program control program module for controlling communication of said operational control messages with said simulation program modules, symbol control program modules, menu control program module and command control program module, said method comprising the steps of:

displaying a diagram including a plurality of symbols indicative of an arrangement of said plurality of components of said real time system on the display screen;

designating one of the symbols displayed on the display screen by a user;

issuing, by said command control program module, a first operation control message including a command and destination information corresponding to the symbol designated by the user;

providing by said inter-program control program module said first operation control message to first one of said simulation program modules specified by said destination information of the first operation control message;

issuing by said first one of said simulation program modules, in response to said first operation control message, a menu control message for instructing said menu control program module to present a group of commands in said command menu;

providing by said inter-program control program module said menu control message to said menu control program module;

outputting by said menu control program module the group of commands in said command menu on the display screen in response to said menu control message;

designating one of the groups of commands in said command menu by the user;

issuing by said command control program module a second operation control message addressed to said first one of said simulation program modules and including a command corresponding to said one of commands designated by the user;

providing by said inter-program control program module said second operation control message to said first one of said simulation program modules;

issuing by said first one of said simulation program modules, in response to said second operation control message, a third operation control message addressed to a second one of said simulation program modules;

providing by said inter-program control program module said third operation control message to said second one of said program modules;

performing by said second one of said simulation program modules a simulation operation based on contents of said third operation control message and issuing a symbol control message which is addressed to one of said symbol control program modules and indicative of an object operational state change caused by a result of the simulation operation;

providing, by said inter-program control program module, said symbol control message to said one of the symbol control program modules; and, changing by said one of said symbol control program objects the operational state of one of the components pictorial graphical symbols on the display screen based on contents of said symbol control message.

20. A computer implemented method for simulating behavior of a real time system as set forth in claim 19, further comprising the steps of:

issuing, by said second one of said simulation program modules, a fourth operation control message addressed to a third one of said simulation program modules through the simulation operation executed in response to said third operation control message;

providing, by said inter-program control program module, said fourth operation control message to said third one of said simulation program modules;

performing, by said third one of said simulation program modules an simulation operation based on contents of said fourth operation control message and generating a second symbol control message which is addressed to second one of said symbol control program modules and indicative of an object state change caused by a result of the simulation operation;

providing, by said inter-program control program module, said second symbol control message to said second one the symbol control program modules; and changing, by said second one of the symbol control program modules, a state of second one of the component graphic symbols on said display screen based on contents of said second symbol control message.

21. A computer implemented method for simulating behavior of a real time system as set forth in claim 20, further comprising:

providing said data processor with conversion table means for storing data indicative of relationships between said plurality of simulation program modules and said plurality of symbol control program modules, and with each of said simulation program modules, referencing said conversion table means to designate one of the symbol control program modules to which a symbol control message generated by the simulation program module is addressed.

22. A computer implemented method for simulating behavior of a real time system as set forth in claim 20, further comprising:

providing each of said operation control messages, menu control messages and object control messages with an object name indicative of a source of the message and an object name indicative of a destination of the message, and operating said inter-program control program to distribute the respective messages in accordance with said destination object name of said respective messages.

23. A computer implemented method for simulating behavior of a real time system as set forth in claim 22, further comprising operating said inter-program control program to delay the message, when the message includes information to designate a distribution time, until time reaches said distribution time.

* * * * *

UNITED STATES PATENT AND TRADEMARK OFFICE
CERTIFICATE OF CORRECTION

PATENT NO. : 5,335,339
DATED : August 2, 1994
INVENTOR(S) : Yukihito Maejima, et al.

It is certified that error appears in the above-indentified patent and that said Letters Patent is hereby corrected as shown below:

Claim 1, column 14, line 64, delete the third occurrence of "of" and substitute therefor --or--.

Claim 7, column 16, line 33, delete ",".

Claim 7, column 16, lines 40 and 41, delete "components" and substitute therefor --component--.

Claim 7, column 16, line 56, before "communication" insert --a--.

Claim 7, column 16, line 60, before "command" insert --a--.

Claim 7, column 17, lines 13-14, delete "includes" and substitute therefor --including--.

Claim 7, column 17, line 17, delete "e" and substitute therefor --be--.

Claim 7, column 17, line 19, before "specific" insert --a--.

Claim 8, column 17, line 37, delete "of" and substitute therefor --for--.

Claim 11, column 17, line 58, delete the first occurrence of "of" and substitute therefor --for--.

Claim 14, column 18, line 56, after "by" insert --said--.

Claim 19, column 19, line 62, before "data" insert --a--.

Claim 19, column 19, line 63, before "operation" insert --an--.

Claim 20, column 21, line 25, delete "an" and substitute therefor --a--.

UNITED STATES PATENT AND TRADEMARK OFFICE
CERTIFICATE OF CORRECTION

PATENT NO. : 5,335,339
DATED : August 2, 1994
INVENTOR(S) : Yukihito Maejima, et al It is certified that error appears in the above-indentified patent and that said Letters Patent is hereby corrected as shown below:

Column 21, claim 20, line 34, before "the" insert --of--.

Signed and Sealed this

Eighth Day of November, 1994

BRUCE LEHMAN

*Attest:*

*Attesting Officer*     *Commissioner of Patents and Trademarks*